UNITED STATES PATENT OFFICE.

JOSEPH WILLIAM SUTTON, OF CHELMER, QUEENSLAND.

PROCESS OF SEPARATING GOLD FROM ITS CHLORID SOLUTIONS.

SPECIFICATION forming part of Letters Patent No. 521,899, dated June 26, 1894.

Application filed December 28, 1892. Serial No. 456,586. (No specimens.)

*To all whom it may concern:*

Be it known that I, JOSEPH WILLIAM SUTTON, a subject of the Queen of Great Britain, residing at Chelmer, in the county of Stanley and Colony of Queensland, have invented certain new and useful Improvements in the Separation of Gold from its Chlorid Solutions; and I do hereby declare that the following is a full, clear, and exact description of the invention, which will enable others skilled in the art to which it appertains to use the same.

My invention relates to the separation of gold from the solution obtained by the action of chlorine on gold or ores containing it.

The object of these improvements is to effect a thorough and rapid separation of the gold from the chlorine solution and to obtain the gold in a concentrated form and in such a state that it can be easily filtered out.

Heretofore, in practice, the usual precipitants for gold from its chloride solution have been either sulphate of iron or charcoal, but both of these have been found unsatisfactory, the former chiefly on account of a portion of the gold passing through the filters in a fine state of division, necessitating in some cases a second filtration, and the latter on account of the large quantity of charcoal which has to be used in proportion to the gold saved, and the difficulties arising from the separation of the gold from the charcoal.

One part of my invention consists essentially in utilizing a hydro-carbon fluid preferably a cheap mineral oil such as kerosene as a collector of the gold when sulphate of iron or other reagent is used for decomposing the solution of gold, while the other part of my invention consists essentially in using a volatile hydro-carbon fluid or a resin preferably of turpentine as a collector of gold from its chloride solution.

Although a hydro-carbon fluid alone will act as a collector of precipitated gold if accompanied by continued agitation, in carrying my invention into practice I prefer to add an alkali such as caustic soda or borax to the solution so as to facilitate the distribution of the hydro-carbon, the alkali, after the gold has been precipitated (preferably by sulphate of iron), being neutralized by dilute sulphuric acid. The hydro-carbon being thus set free, the fine particles of gold are carried with it either to the top or bottom of the vat according to the specific gravity of the hydrocarbon used, which is then separated from the other liquid and filtered to recover the gold.

In using a volatile oil or a resin to deposit gold from its chloride solution the operation is similar to that hereinbefore described with the exception that I prefer to warm the solution in order to hasten the operation and that I do not add sulphate of iron or other reagent as the oil or resin (preferably rendered alkaline) deposits the gold. But in order that my invention may be thoroughly understood I will now describe how to carry the same into practice.

In one form of my process I proceed as follows: Having approximately ascertained the number of grains of gold which the chloride solution carries to the gallon—for example say ten grains to the gallon—I add fifteen times the weight say one hundred and fifty grains of a saturated solution of borax, or a similar quantity of a fifty per cent. solution of an alkali, and then add thirty times the weight of hydro-carbon say kerosene oil, that is three hundred grains or one per cent. to the gallon of chloride solution. The whole is then well agitated and while in a state of agitation I add one hundred and fifty grains of a saturated solution of sulphate of iron or about fifteen times the weight of the gold contained in the solution. After this agitation has been continued for about three or four minutes the whole is then run into a vat or receiver and allowed to stand for say fifteen minutes when it will be found that the whole of the gold (and the surplus iron which has been precipitated by the alkali) rises to the top leaving the lower portion of the vat free from gold. I then run off the surplus waste solution from which the gold has been extracted as near as practicable to the floating mass of oil containing the gold and such or some of the iron which has been precipitated by the alkali to which I then add dilute sulphuric acid which serves a threefold purpose by dissolving the iron precipitated by that alkali; by freeing the oil particles and by increasing the density of the solution. The oil having been set free by the acid carries the particles of gold with it to the surface. The whole is then filtered and the acid and oil. afterward separated by gravity. The oil is then ready for fresh operations while the acid may be further strengthened with iron and used again as sulphate of iron. The gold, which is all left in the filter, is now in a state to be melted into ingots.

In using a volatile oil or a resin to separate the gold I proceed as follows: To a chloride of gold solution carrying say ten grains of gold to the gallon I add one hundred and fifty grains of a saturated solution of borax, or a similar quantity of a fifty per cent. alkaline solution. I then add three hundred grains of turpentine, or thirty times the weight of the gold contained in the solution. The whole is then agitated for about thirty minutes during which time I heat the solution to about 180° Fahrenheit to facilitate the operation. I then add dilute sulphuric acid to free the oil which rises to the surface carrying the gold with it. The contents of the vat are then filtered and the operation continued as hereinbefore described.

Having now described my invention, what I claim as new, and desire to secure by Letters Patent, is—

1. In the separation of gold from its chlorid solutions, the improvement which consists in mixing the solution with a vehicle for the gold, substantially such as described, precipitating the gold by means of a suitable reagent, as sulfate of iron, separating the vehicle containing the gold from the spent solution, treating said vehicle with a suitable reagent, as sulfuric acid, and filtering the gold from the vehicle, substantially as and for the purpose set forth.

2. In the separation of gold from its chlorid solutions, the improvement which consists in mixing the solution with a vehicle for the gold, substantially such as described, and with a distributer of said vehicle, as an alkali, precipitating the gold in the mixture by a suitable reagent, as sulfate of iron, and agitating the mixture during the operation of precipitation, allowing the vehicle to collect and entrain the precipitate of gold, separating the vehicle containing the gold precipitate from the spent solution, treating said vehicle with a suitable reagent, as sulfuric acid, for the purposes stated, and separating the gold therefrom.

In witness whereof I have hereunto set my hand in presence of two witnesses.

JOSEPH WILLIAM SUTTON.

Witnesses:
JOHN THOMAS GRAHAM,
*Eagle St., Brisbane, Storekeeper.*
CHARLES EDWARD GRAHAM,
*21 Queen Street, Brisbane, Patent Agent.*